United States Patent [19]
Capel

[11] Patent Number: 5,138,250
[45] Date of Patent: Aug. 11, 1992

[54] METHOD OF CONTROLLING A CHOPPER REGULATOR AND A CIRCUIT IMPLEMENTING SAID METHOD

[75] Inventor: Antoine Capel, Ramonville, France
[73] Assignee: Alcatel Espace, Courbevoie, France
[21] Appl. No.: 711,829
[22] Filed: Jun. 7, 1991

[30] Foreign Application Priority Data

Jun. 8, 1990 [FR] France ................................ 90 07152

[51] Int. Cl.⁵ .............................................. G05F 1/56
[52] U.S. Cl. ..................................... 323/283; 323/224; 323/285
[58] Field of Search ............... 323/224, 282, 283, 284, 323/285

[56] References Cited

U.S. PATENT DOCUMENTS

| | | | |
|---|---|---|---|
| 4,161,023 | 7/1979 | Goffeau | 363/124 |
| 4,323,845 | 4/1982 | Leach | 323/224 |
| 4,672,303 | 6/1987 | Newton | 323/285 |
| 4,931,716 | 6/1990 | Jovanovic et al. | 323/285 |

OTHER PUBLICATIONS

ESA Journal, vol. 10, 1986, pp. 387–402; A. Capel & J. C. Marpinard: "A Bi-Directional High-Power Cell Using Large-Signal Feedback Control With Maximum Current Conduction Control for Space Applications".

Primary Examiner—Peter S. Wong
Attorney, Agent, or Firm—Sughrue, Mion, Zinn, Macpeak & Seas

[57] ABSTRACT

A method of controlling a chopper regulator, which method is a time-varying parameter-regulation method having a very wide passband and controlling energy at each instant, in which the stable state of the system at the following sample is predicted, thereby making it possible to achieve regulation under very good safety conditions. A circuit for implementing the method is also disclosed. The invention is particularly suitable for space applications.

10 Claims, 2 Drawing Sheets

METHOD OF CONTROLLING A CHOPPER REGULATOR AND A CIRCUIT IMPLEMENTING SAID METHOD

The invention relates to a method of controlling a chopper regulator and to a circuit for implementing the said method.

BACKGROUND OF THE INVENTION

The method of the invention may be used whenever servo-control is inserted in electrical chopper structures for the purpose of regulating a parameter. Applications of the invention, extend, in particular, to space applications, aviation applications, and consumer applications.

The method of the invention is a method of controlling chopper regulators in particular on the basis of a bidirectional peak current controlled modulator and of a stabilizing control by state feedback.

To obtain dynamic performance compatible with that of DC amplifiers while implementing high power levels (a few watts to several kW) at high energy efficiency (greater than 85%), chopper regulators and amplifiers must combine:

a high synchronization frequency (a few fractions of a MHz to several MHz); and large signal servo-control with a passband which is close as possible to one-half the sampling frequency.

At present, two techniques are in competition:

non-linear analog stabilizing control by feeding back the prior states of the various possible states of the system; and digital control with prior storage of the various possible states of the system in a memory.

Stabilizing control by state feedback may be performed by a self-adaptive feedback loop such as that described in an article by G. Salut, J. C. Marpinard and M. Valentin entitled: "Large signal feedback control for power switching conversion" (PESC 1985, Toulouse).

In the context of a buck chopper voltage regulator, this feedback loop implements:

two linear amplifiers;

a summing circuit; and a non-linear function divider (a non-linear pulse width modulation (PWM) modulator for transforming an analog magnitude into a duration in time with a given clock).

With a boost regulator, the following are used:

seven linear amplifiers;

two dividers and a non-linear multiplier;

a summing circuit; and a non-linear PWM modulator.

As described in an article by A. Capel, J. C. Marpinard, G. Salut, M. Valentin and D. O'Sullivan entitled "A bidirectional high power cell using large signal feedback control with maximum conduction control for space applications" (ESA Journal, 1986, Vol. 10) a possible simplification lies in the fact that information previously collected from the middle of the power circuit in the inductor L and the load R can be combined at the current through the capacitor C, while the PWM modulator may be biased by the input voltage V, thereby making it possible to eliminate the non-linear function divider.

The control unit is then reduced to:

three amplifiers;

a summing circuit; and a non-linear PWM modulator.

It may be observed that the current sensors in all of these systems are unsuitable for providing protection against short circuits in the regulator or in its load.

An object of the invention is to solve this problem.

SUMMARY OF THE INVENTION

To this end, the present invention provides a method of controlling a chopper regulator, the method being a time-varying parameter-regulation method with a very wide passband and with energy being controlled at each instant, in which the stable state of the system on the following sample is predicted, thereby making it possible to provide regulation under good safety conditions.

Advantageously, this method makes it possible to provide intrinsic protection against the damaging effects of current and voltage surges due to the facts that:

the input energy source is voltage limited (a set of batteries, a solar panel, a distribution network);

the output voltage is generally the parameter that is servo-controlled and thus limited in amplitude; and the energy in transit is controlled by measuring pulse current.

BRIEF DESCRIPTION OF THE DRAWINGS

Embodiments of the invention are described by way of example with reference to the accompanying drawings, in which.

DETAILED DESCRIPTION OF THE PREFERRED EMBODIMENTS

Figure 1:
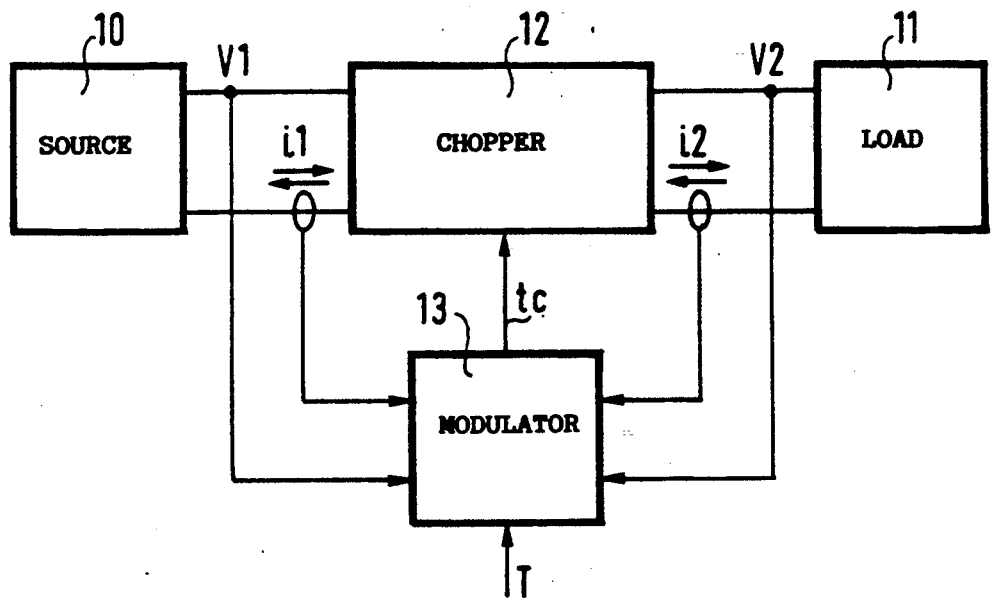
FIGS. 1 and 2 show the operation of the method of the invention.

The method of the invention is a method of regulating a time-varying parameter which is applied to a chopper regulator servo-control loop when energy transfer is to be controlled by state feedback stabilizing control as shown in the diagram of FIG. 1.

A bidirectional regulator structure 12 is to be found between an input network 10 and an output network 11. A modulator 13 synchronized by an external clock T and receiving the input and output voltages V1 and V2 and the input and output currents i1 and i2 serves to control the bidirectional structure 12 (tc).

In this diagram, energy may pass from the input network 10 which contains the energy source at a potential V1 to the load network at a potential V2, which load network may be passive or may also contain a source of energy such that the energy transmitted E is a function of a control voltage Vc obeying a law of the form:

$$E = f(Vc).$$

In this case, the servo-controlled parameter is the load voltage V2, and the energy E taken from the input network 10 is matched to the needs of the servo-control by the law given above. If an upper value limit is applied to this energy by acting on said law, then no damaging situation can occur in the output network 11 or in the chopper regulator structure 12 itself.

The regulator structure 12 is bidirectional, i.e. the same electrical structure applies when the networks V1 and V2 are interchanged, providing, as shown in FIG. 1, the servo-controlled parameter and the energy-deliverying network are not both on the same side of the regulator structure 12.

The intrinsic protection of this structure 12 against the damaging effects of current and voltage surges lies in the facts that:
the energy source V1 is voltage limited (set of batteries, solar panels, distribution network);
the output voltage V2 is generally the parameter to be servo-controlled, and it is thus amplitude limited; and
the energy E transistor through the structure is controlled by taking pulsed current i1(t) such that:

$$E = V1 \int_0^{tc} i1(t)dt = V2 \cdot i2 \cdot T$$

where
t is the time that energy flows because the switches in the static regulator are conductive; and
T is the period of the synchronization clock.

The pulsed current i1(t) cannot reach damaging values since it is peak current controlled directly at the source by means of a law of the form:

$$i1\, Max = G \cdot Vc$$

where
G is a constant; and
Vc is the control voltage.

It follows that if this relationship has an upper limit, then the corresponding current can never be exceeded positively or negatively since the transfer principle is bidirectional even in the event of short circuit.

The control voltage Vc is the result of a stabilizing control by state feedback which takes account of the instantaneous values of all of the system parameters and which has the general form:

$$Vc = (1-K) \cdot k1 \cdot (VR - V2) + k2 \cdot i2 + k3 \cdot V2 + k4 \cdot V1$$

where:
VR is a reference voltage;
k1, k2, k3, and k4 are pure gains; and
K is a constant that determines the dynamic range of the system and is such that $0 \leq K \leq 1$.

When K→0 servo-control is fast, and when K→1 servo-control is slow.

Figure 2:
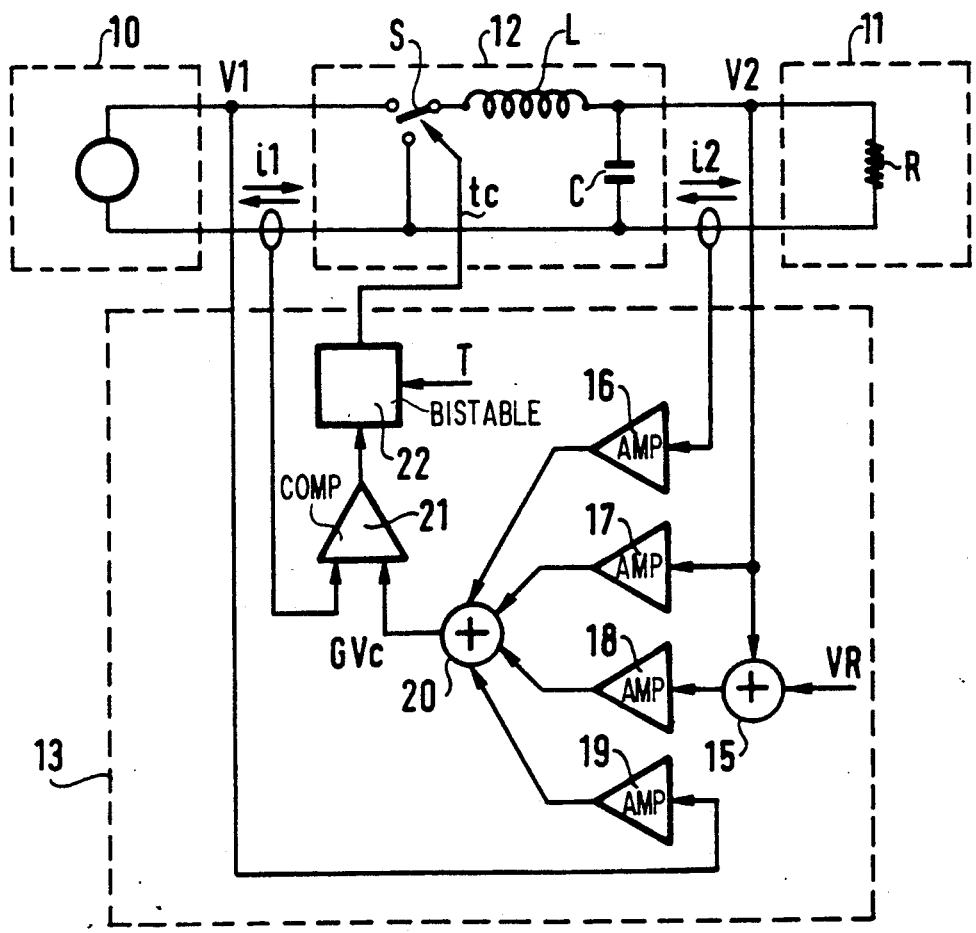

The above relationship giving Vc is established by investigating the large-signal dynamic behavior of the electrical system in state space, thereby making it possible to fix the values of the pure gains kn without thereby modifying the general appearance of the relationship which remains valid for all configurations of chopper regulators, hence the wide range of applications for which this control principle is suitable, and a general block diagram is given in FIG. 2.

The control voltage Vc is calculated either by analog means or by digital means, e.g. using a microprocessor.

The power circuit shown is an LC circuit, i.e. it is a second order circuit, however it could naturally be a different circuit of higher order.

The modulator 13 comprises a summing circuit 15, four amplifiers 16, 17, 18, and 19 of respective gains k2, k3, k1·(1−K), and k4, a summing circuit 20, a comparator 21 for comparing the calculated value G·Vc with the measured current i1, and a bistable 22.

This circuit does not use a sawtooth modulator, nor does it use non-linear functions such as multipliers or dividers, it only uses linear amplifiers, a comparator, and a logic circuit which actuates the switch S in response to a clock signal T and causes the switch S to change over whenever:

$$i1(t) = G \cdot Vc(t)$$

The time t which satisfies this relationship thus defines the duty ratio of the converter and remains under conventional energy transfer laws inherent to the structure of the converter. This gives:

$$D = tc/T$$

Figure 3:
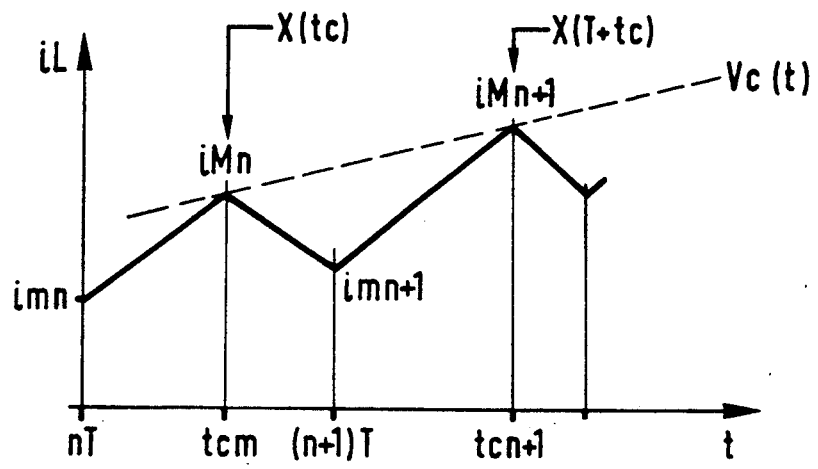
FIG. 3 is a graph showing how current varies under transient conditions.

Whatever the type of the chopper regulator, the current flowing through the inductor of the circuit has a triangular waveform as shown in FIG. 3. Under transient conditions where the system is operating a long way from its equilibrium point, the peak value iM of the current differs from sampling period number n to the following period number n+1. Thus:

$$iM(nT) \neq iM(n+1)T$$

At equilibrium a current is obtained in which the triangles are equal.

The method of the invention consists in calculating during sample nT the value that the peak current iM is to reach during the following sample (n+1)T, taking account of the values of various parameters during the period. The following recurrence relationship thus applies:

$$iM((n+1)T) = f(iM(nT), V1(nT), V2(nT))$$

Since the current i1(t) is measured on a permanent basis, the switches S and $\bar{S}$ are activated by an external clock T and they are deactivated whenever i1(t) equals iM(n+1)T.

The information input at an instant nT varies little within the circuit and is input into a calculator circuit 25 which serves to predict the values of the state vector at the following instant (n+1)T. The limiting value for the following sample is known. The system therefore stops when all of the values of the state vector have reached their calculated values.

The consequences of a disturbance are thus predicted before they happen: digital anticipation takes place.

The calculator circuit 25 could be constituted by a microprocessor.

The system changes smoothly throughout the transient period. It is thus possible to reach equilibrium in three samples, for example.

Figure 4:
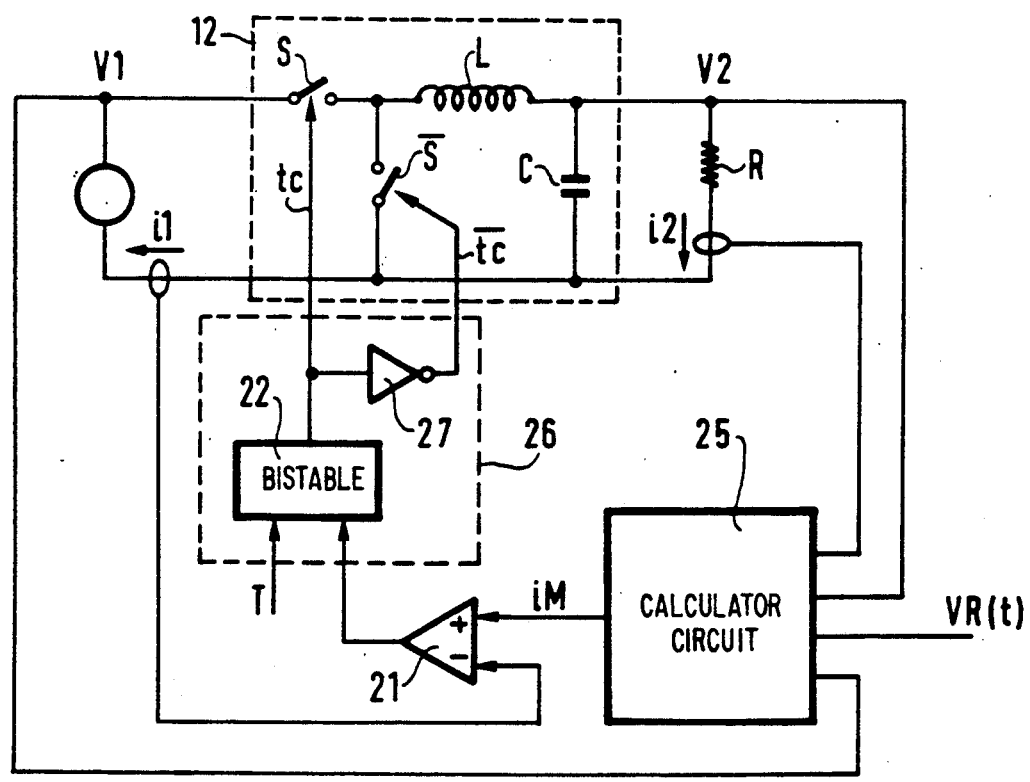
FIG. 4 shows the control principle of the method of the invention.

This gives rise to the circuit shown in FIG. 4. The input and output voltages V1 and V2 and the output current i2 are measured and associated with a reference VR(t) to generate the peak value iM of the current i(t) during the period (n+1). The circuit 25 is a circuit for calculating iM((n+1)t).

The information iM is compared on a permanent basis with the value of the current i1(t) flowing through the structure. Whenever the above relationship is satisfied, the ON-time T(c) of the switch S previously activated by the clock T and which corresponds to dynamically stable operation of the system is achieved. The switch S is deactivated and the switch $\bar{S}$ is activated by means of the logic circuit 26 which includes the bistable 22 and the NOT gate 27.

If an upper limit is applied to the calculation of iM, then the current i2(t) can never exceed this value even during a short circuit. This method does not make use of non-linear functions such as division, function multiplication, or PWM modulation.

The calculation of iM((n+1)T) as occurs in the functions of the control member of FIG. 4 is a hard-wired representation of the state feedback stabilizing control theory which is described briefly for the application of FIG. 4 where the power structure is a buck type cell.

If X is the state vector of the system and A and B are the matrices of the electrical network of the buck cell, then:

$$X(t) = \begin{bmatrix} i2(t) \\ V2(t) \end{bmatrix}$$

$$A = \begin{bmatrix} 0 & -1/L \\ 1/C & -1/RC \end{bmatrix}$$

$$B = \begin{bmatrix} 1/L \\ 0 \end{bmatrix}$$

The state equations of this circuit over one period give rise to the recurrence relationship, and with reference to FIG. 3:

$$X(T+tc) = e^{AT} \cdot X(tc) + A^{-1} \cdot [e^{ATc} - 1] \cdot BV$$

which can be put into simple form by being limited to second order developments, which is completely justified since the time constants of the circuit are greater than the period T:

$$X(T+tc) = (1 + AT + (AT)^2/2) \cdot X(tc) + tc \cdot V \cdot (A + A \cdot tc/2) \cdot B$$

Giving a state vector having the following components:

$$i(n+1) = (1 - T^2/2LC) \cdot in + [(T^2/2LRC) - (T/L)] \cdot Vn + tc \cdot V/L$$

$$V(n+1) = [(T/C) - (T^2/2RC^2)] \cdot in + [1 - (T/RC) + \tfrac{1}{2}T^2[(-1/LC) + 1/(RC)^2]] \cdot Vn + tc \cdot V\tfrac{1}{2}LC$$

Dynamic performance is fixed by the recurrence relationship imposed on the system, with VR being the reference and K being a constant lying in the range 0 to 1.

$$V(n+1) - VR = K \cdot (Vn - VR)$$

By replacing V(n+1) with its value in the preceding system, it becomes:

$$i(n+1) = iM((n+1)T) = (1-K)(e/T)(VR - Vn) + i2 - (T/L) \cdot Vn + tc \cdot V1/L$$

which is the same as the general form described above $$iM((n+1)T) = (1-K) \cdot k1 \cdot (VR - V2) + k2 \cdot i2 + k3 \cdot V2 + k4 \cdot V1$$

This general form is valid for all chopper regulator structures.

The circuit of one structure is given in FIG. 2.

Thus, in the method of the invention, the system is analyzed in a closed loop: the output voltage V2 is controlled by controlling the current i2 flowing from the input to the output, the energy is controlled by controlling the quantity of energy flowing at any one instant. The current i2 and the voltage V2 form the components of a state vector.

Naturally the present invention has been described and shown merely by way of preferred example and its component parts could be replaced by equivalent parts without thereby going beyond the scope of the invention.

What is claimed is:

1. A method for controlling a chopper regulator of a servo-control system, wherein said method is a time-varying parameter-regulation method with a wide passband, said method comprising the steps of:
   (a) predicting a stable state of the system at a subsequent sample using parameters associated with a first sample; and
   (b) continuously controlling energy being transmitted to a load network from a source network in accordance with the stable state predicted, thereby making it possible to provide regulation under good safety conditions.

2. A method according to claim 1, wherein all of the parameters are stored in a memory, and wherein said method further comprises the steps of:
   (c) analyzing behavior of the system in state space; and
   (d) stopping the system once the system has stabilized.

3. A method according to claim 2, wherein step (a) comprises the step of setting a looked-for energy value prior to step (d), and wherein step (d) stops the system when said looked-for energy value is reached.

4. A method according to claim 1, wherein the energy transmitted is a function of a control voltage.

5. A method according to claim 4, wherein the control voltage is the resultant of a state feedback stabilizing control which takes account of all of the parameters in instantaneous form.

6. A method according to claim 4, wherein the control voltage (Vc) is calculated either by analog means or digital means.

7. A method according to claim 5, wherein the control voltage (Vc) is of the form:

$$Vc = (1-K) \cdot k1 \cdot (VR - V2) + k2 \cdot i2 + k3 \cdot V2 + k4 \cdot V1$$

where:
k1, k2, k3 and k4 are pure gains;
K is a constant that fixes a dynamic range of the system;
V1 and V2 are input and output voltages;
i2 is an output current; and
VR is a reference voltage.

8. A method according to claim 1, wherein the chopper regulator is a bidirectional regulator disposed between the input network and the output network, and wherein said predicting step (a) comprises the steps of:
   receiving input and output voltages and input and output current from the input and output networks, and
   generating a peak value of the input current during the period of the subsequent sample.

9. A method according to claim 8, wherein said predicting step (a) further comprises the step of comparing the peak value with the value of the input current from the source network, and wherein when the value of the input current and the peak value are equal, the system has reached a dynamically stable operation.

10. An apparatus for controlling a chopper regulator, said apparatus comprising:
a source network;
a load network;
a chopper regulator for regulating energy being transmitted to said load network from said source network, wherein the energy transmitted is a function of a control voltage; and
a modulator including at least:
  a first summing circuit;
  first through fourth amplifiers having respective gains k2, k3, k1 (1−K), and k4 so as to obtain a maximum current value (iM), with iM=G.Vc where Vc is the control voltage which has the form:

$$Vc = (1-K) \cdot k1 \cdot (VR - V2) + k2 \cdot i2 + k3 \cdot V2 + k4 \cdot V1$$

where:
k1, k2, k3, and k4 are pure gains;
K is a constant that fixes a dynamic range of the system;
V1 and V2 are input and output voltages;
i2 is an output current; and
VR is a reference voltage,
a second summing circuit, and
a comparator for comparing an input current from said source network with the maximum current value iM of the input current.

* * * * *